United States Patent
Park et al.

(10) Patent No.: US 9,424,251 B2
(45) Date of Patent: Aug. 23, 2016

(54) METHOD FOR EXTRACTING SEMANTIC DISTANCE FROM MATHEMATICAL SENTENCES AND CLASSIFYING MATHEMATICAL SENTENCES BY SEMANTIC DISTANCE, DEVICE THEREFOR, AND COMPUTER READABLE RECORDING MEDIUM

(71) Applicant: SK TELECOM CO., LTD., Seoul (KR)

(72) Inventors: Keun Tae Park, Seongnam-si (KR); Yong Gil Park, Seongnam-si (KR); Hyeongin Choi, Seoul (KR); Nam Sook Wee, Seoul (KR); Doo Seok Lee, Seoul (KR); Jung Kyo Sohn, Seoul (KR); Haeng Moon Kim, Gwacheon Gyeonggi-do (KR); Dong Hahk Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 292 days.

(21) Appl. No.: 13/911,950

(22) Filed: Jun. 6, 2013

(65) Prior Publication Data

US 2013/0275122 A1 Oct. 17, 2013

Related U.S. Application Data

(63) Continuation of application No. PCT/KR2011/009439, filed on Dec. 7, 2011.

(30) Foreign Application Priority Data

Dec. 7, 2010 (KR) .......................... 10-2010-0124384
Dec. 7, 2011 (KR) .......................... 10-2011-0130024

(51) Int. Cl.
*G06F 17/27* (2006.01)
*G06F 17/28* (2006.01)

(52) U.S. Cl.
CPC ............. *G06F 17/28* (2013.01); *G06F 17/271* (2013.01); *G06F 17/2785* (2013.01)

(58) Field of Classification Search
CPC ........ G06F 17/20; G06F 17/10; G06F 17/21; G06F 17/215; G06F 17/11; G06F 17/27; G06F 17/72785; G06F 17/2881; G06F 17/30
USPC ...................................... 704/9, 1, 2, 3, 5, 10
See application file for complete search history.

(56) References Cited

U.S. PATENT DOCUMENTS 6,523,026 B1 * 2/2003 Gillis
2002/0126905 A1 * 9/2002 Suzuki et al. ................ 382/229
2004/0114258 A1 * 6/2004 Harris et al. .................. 359/841

OTHER PUBLICATIONS

J. Misutka, Extending Full Text Search Engine for Mathematical Content, Jul. 27, 2008, pp. 55-67, Masaryk University, Birmingham, United Kingdom.

(Continued)

*Primary Examiner* — Qi Han
(74) *Attorney, Agent, or Firm* — Hauptman Ham, LLP (57) ABSTRACT

A method of extracting the semantic distance from the mathematical sentence and classifying the mathematical sentence by the semantic distance, includes: receiving a user query; extracting at least one keyword included in the received user query; and extracting a semantic distance by, indexing one or more of natural language tokens and mathematical equation tokens including semantic information, extracting the semantic distance, between the at least one extracted keyword and the one or more indexed semantic information by referring indexed information, and acquiring a similarity of the received user query and the semantic information.

14 Claims, 7 Drawing Sheets

(56) References Cited

OTHER PUBLICATIONS

Junsoo Shin, Mathematical Equation Retrieval Based on Properties of Mathematical Symbols, Nov. 30, 2009, pp. 188-193, vol. 36, No. 2(C), Program of Computer and Communications Engineering, Kangwon National University.

Junsoo Shin, An Equation Retrieval System Based on Weighted Sum of Heterogenous Indexing Terms, Oct. 30, 2010, pp. 745-750, vol. 37, No. 10, Program of Computer and Communications Engineering, Kangwon National University.

M. Adeel, Math Go! Prototype of a Content Based Mathematical Formula Search Engine, Journal of Theoretical and Applied Information Technology, Oct. 30, 2008, pp. 1002-1012, vol. 4, No. 10, Dept of Computer Science, Faculty of Basic & Applied Sciences, International Islamic University, Islamabad, Pakistan.

International Search Report mailed Jul. 9, 2012 for PCT/KR2011/009439.

Tuo, Lu, "Description and Retrieval of Mathematical Formulas in the Technical Documents", Lu Tuo, full-text database of Chinese excellent master's theses, May 15, 2009, pp. 7-14 and 30-39, volume of information technology, the 5th issue.

\* cited by examiner

```
<CompoundSentence>
 <SentenceRel>
 <imply/>
   <SentenceRel>
   <and/>
     <SimpleSentence>
     ....
     </SimpleSentence>
     <SimpleSentence>
     ....
     </SimpleSentence>
   </SentenceRel>
   <SentenceRel>
   <or/>
    <SentenceRel>
    <not/>
      <SimpleSentence>
      ....
      </SimpleSentence>
    </SentenceRel>
     <SimpleSentence>
     ....
     </SimpleSentence>
   </SentenceRel>
 </ SentenceRel >
</CompoundSentence>
```

*FIG. 3*

| Type | Expression | Example |
|---|---|---|
| Type1 | Action(Object)<br>Result(Object) | Integrate(x2+1) Integrate(polynomial of degree 2), Integrate(Quadratic Equation)<br><br>Result: $\frac{x^3 + x + c}{3}$ |
| Type2 | Action<br>(Object * Object) | Solve($x^2$+3x = 2x + 2) Solve(polynomial of degree 2 = polynomial of degree 1), Solve(Quadratic Equation = Linear Equation) |
| Type3 | Action((Object * Object) ∩ (Object...)...) | Solve((3x+y=2) ∩ (x+2y=7)) → Solve((2 variables, polynomial of degree 1) ∩ (2 variables, polynomial of degree 1)), Solve( ∩ linear equation with 2 variables linear equation with 2 variables ) |

*FIG. 4*

Action: FindRoot
Semantic Description: Quadratic equation
Object:

6A
Action: FindRoot
Semantic Description: Quadratic equation
Object:

$$x^2 + 2x - 3 = 0$$

6B
Action: Integral
Semantic Description: Quadratic equation
Object:

| Semantic Element(1) | Problem 1 | Problem 2 | Problem 3 | Problem 4 | Problem 5 | Problem 6 |
|---|---|---|---|---|---|---|
| Polynomial | 1 | 1 | 0 | 0 | 0 | 1 |
| Function | 1 | 1 | 0 | 1 | 0 | 0 |
| Factor | 1 | 1 | 0 | 1 | 1 | 1 |
| Solve | 0 | 1 | 0 | 0 | 0 | 0 |
| Evaluate | 1 | 0 | 0 | 0 | 0 | 0 |
| Number of variables = 1 | 1 | 0 | 1 | 1 | 1 | 1 |
| Degree = 2 | 1 | 0 | 1 | 1 | 1 | 0 |

*FIG. 8*

METHOD FOR EXTRACTING SEMANTIC DISTANCE FROM MATHEMATICAL SENTENCES AND CLASSIFYING MATHEMATICAL SENTENCES BY SEMANTIC DISTANCE, DEVICE THEREFOR, AND COMPUTER READABLE RECORDING MEDIUM

CROSS-REFERENCE TO RELATED APPLICATION

The present application is a continuation of International Patent Application No. PCT/KR2011/009439, filed Dec. 7, 2011, which claims priority to Korean Patent Application No. 10-2010-0124384, filed on Dec. 7, 2010 and Korean Patent Application No. 10-2011-0130024, filed on Dec. 7, 2011. Each of the above listed applications is hereby incorporated by reference in their entirety into the present application.

TECHNICAL FIELD

The present disclosure relates in some aspects to a method for extracting a semantic distance.

BACKGROUND

The statements in this section merely provide background information related to the present disclosure and may not constitute prior art.

Human's words are rich and complex as well as include vast vocabularies having a complex grammatical construction and a contextual meaning, but machine or software applications generally need input data according to specific formats or rules. Herein, the input natural language words may be used for almost all software applications for interacting with a human being. Generally, a natural language processing method includes dividing natural words into tokens and mapping the divided tokens to one or more pieces of operational information or actions provided by software applications, in which each software application is set to have a series of unique actions. That is, the natural language processing method is adapted to map a natural word input to appropriate actions suitable for each application, based on software developers' writing of codes for parsing the input.

However, the natural language processing method may neither recognize a mathematical equation nor provide searched results by figuring out the degree of similarity between queries for searching mathematical sentences and the stored mathematical sentences.

SUMMARY

At least one embodiment of the present disclosure provides an apparatus of extracting a semantic distance, including: a user query input unit configured to receive a user query, a query parsing unit configured to extract at least one keyword included in the received user query, an index information unit configured to index one or more of natural language tokens and mathematical equation tokens including semantic information, and a semantic distance extraction unit configured to extracting a semantic distance, between the at least one extracted keyword and the one or more indexed semantic information, and acquire a similarity of the received user query and the semantic information based on the extracted semantic distance.

At least one embodiment of the present disclosure provides a method of extracting a semantic distance, the method including: receiving a user query, extracting at least one keyword included in the received user query; indexing one or more of natural language tokens and mathematical equation tokens including semantic information, extracting the semantic distance, between the at least one extracted keyword and the one or more indexed semantic information by referring the indexed information, and acquiring a similarity of the received user query and the semantic information.

Yet another at least one embodiment of the present disclosure provides a non-transitory computer-readable recording medium storing therein a program including computer-executable instructions which, when executed by a processor, cause the processor to perform each process of a method for extracting a semantic distance from a mathematical sentence and classifying the mathematical sentence by the semantic distance.

Advantageous Effects

According to the present disclosure as described above, the similarity can be acquired between the stored mathematical contents at the time of searching the input mathematical sentences, by extracting the semantic distance contained in the mathematical sentences (single or composite sentence) composed of at least one of the natural word and the standardized mathematical equation. Further, the semantic information can be efficiently extracted by converting the input composite sentences into the logical combination of a single sentence and generating the semantic information. Further, operation information or the action of the mathematical sentences can be extracted by matching the representative keywords when the action representations of various sentences are input by defining the representative keywords represented by the mathematical sentences and describing the action.

Additionally provided is the search environment of mathematical contents which cannot be searched by the search method according to the related art, based on the searched results provided by figuring out the similarity between the queries for searching mathematical sentences and the stored mathematical sentences, by recognizing the mathematical equation which is not recognized by the natural language processing method.

DETAILED DESCRIPTION

At least one aspect of the present disclosure is adapted to automatically extract semantic information contained in mathematical sentences composed of at least one of a natural word and a standardized mathematical equation.

Figure 1:
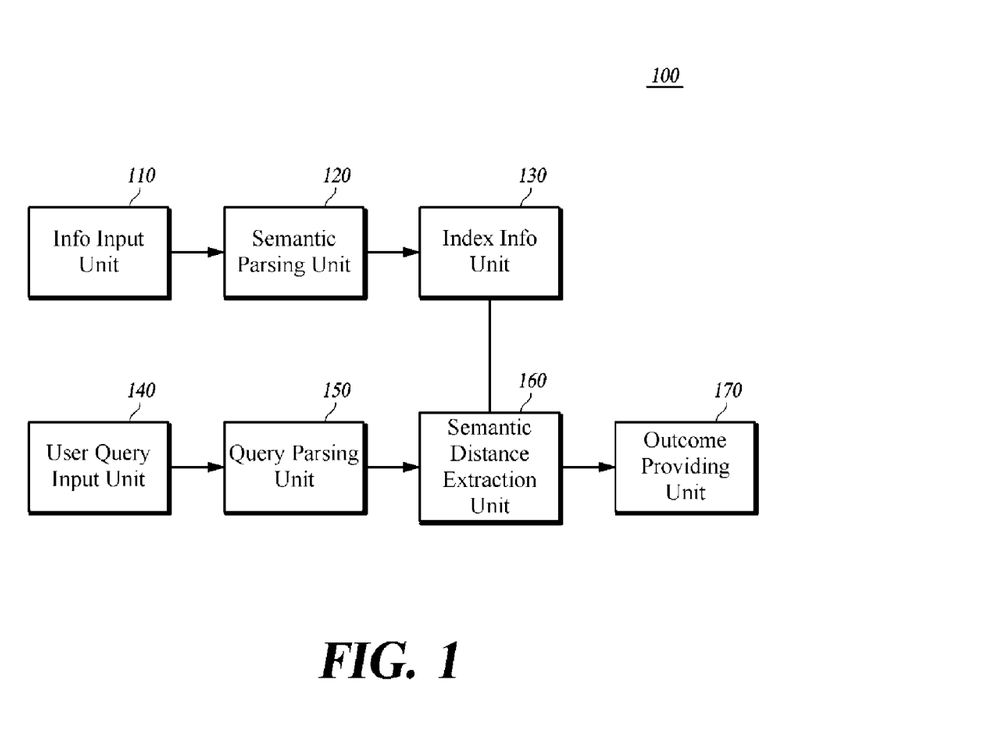
FIG. 1 is a schematic block diagram of a device for classifying mathematical sentences according to at least one embodiment of the present disclosure.

FIG. 1 is a schematic block configuration diagram of an apparatus for classifying mathematical sentences according to at least one embodiment of the present disclosure.

An apparatus for classifying mathematical sentences according to at least one embodiment of the present disclosure may be configured to include information input unit 110, semantic parsing unit 120, index information unit 130, user query input unit 140, query parsing unit 150, semantic distance extraction unit 160, and outcome providing unit 170.

The information input unit 110 receives a combination data (composite sentence) of at least one of a natural word and a mathematical equation. Herein, the information input unit may directly receive the natural word/mathematical equation combination data by user's manipulation or command but the present disclosure is not necessarily limited thereto, and therefore may receive document data of at least one of a natural word and a mathematical equation combined from a separate external server.

Figure 2:
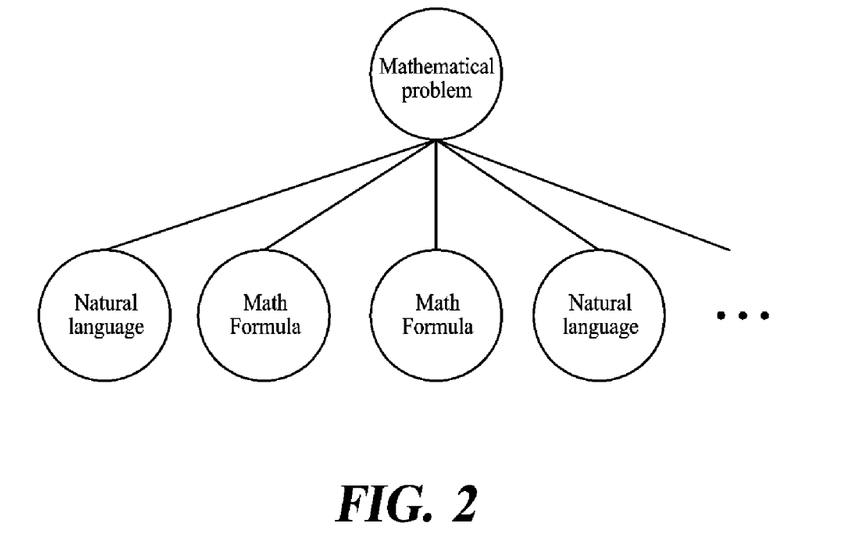
FIG. 2 is an exemplary diagram of a tree type representation of a composite sentence according to at least one embodiment of the present disclosure.

FIG. 2 is an exemplary diagram of a tree type representation of a composite sentence according to at least one embodiment of the present disclosure.

As illustrated in FIG. 2, to make a tree representation of a structure which a mathematical content may assume, child nodes configuring the same math content (root node) are divided into at least one of a natural language and a mathematical equation while keeping the meaningfully important information of the word order intact. Further, each natural word has a special meaning by different sequences of organizing sentences. That is, many mathematical contents may have a structure of composed mathematical equations based on a natural language. For example, the mathematical contents may have a structure in which a natural word and a following mathematical equation are connected under a specific condition which information is provided about whether the following mathematical equation is defined, and the like. A semantic significance may be extracted with an integration of natural words at respective nodes as well as the meanings of the words and their associations. That is, in order to distinguish actions on whether the mathematical contents need solving or describe the corresponding mathematical equation, and the like, directivity of each natural language token can be grasped by figuring out all the natural words in aggregate by meanings thereof. Herein, the directivity represents whether the natural language token within the mathematical content is associated with the above equation for the corresponding natural language token or the following equation or is independent, and the like.

The semantic parsing unit 120 separately divides the natural word and the mathematical equation from the combination data and parses each configuration information configuring the divided natural words and mathematical equations to generate the semantic information and generate the natural language token and the mathematical equation token. That is, the semantic parsing unit 120 separately divides the natural word and the mathematical equation from the combination data and parses each piece of configuration information configuring the divided natural words and mathematical equations to generate the semantic information. Herein, the semantic information may include actions (also referred to as "operational information") and math objects. Describing in detail the operation of the semantic parsing unit 120, the semantic parsing unit 120 separately divides the natural word and the mathematical equation from the combination data. That is, when the combination data of the natural word and the mathematical equation is input through the information input unit 110, the semantic parsing unit 120 separately divides and recognizes the natural word and the mathematical equation contained in the combination data. The semantic parsing unit 120 parses each configuration information configuring the divided natural words to tokenize the natural language token so as to generate a natural word, filters a stop word based on the natural language token to generate a stop word filtering data, carries out redundancy removal filtering on the stop word filtering data to generate a redundancy removal filtering data, and matches a predefined meaningful action to the redundancy removal filtering data. Herein, the token means a unit that can be distinguished in a continuous sentence and the tokenization means a process for the natural word into a word unit that can be understood by the device 100 for classifying mathematical sentences.

Describing in more detail the tokenization in the embodiment of the present disclosure, the tokenization is largely divided into natural language tokenization and mathematical equation tokenization. The natural language tokenization means a process for recognizing as the natural language tokens each word corresponding to outcomes obtained by dividing natural word included in a combination data (mathematical problems or composite sentences) based on a space. Meanwhile, the mathematical equation tokenization means a process for recognizing, as a mathematical equation token, individual unit information obtained by parsing a mathematical equation contained in a combination data.

Example 1

Find the Function Value $9y3+8y^2-4y-9$ with $y=-1$

For example, the information corresponding to the natural language tokens in [Example 1] may be 'Find', 'the', 'function', 'value', and 'with' and the mathematical equation token may be polynomial, Maxdegree=3, Numofterm=4, and Condition, $y=-1$, and the like, which are values returning after extracting information through parsing.

Further, describing in detail the stop word filtering, the stop word means a set of predefined words to remove portions corresponding to unnecessary tokens at the time of parsing sentences or mathematical equations. That is, among the words of [Example 1], a word (in addition, a, to, or the like) such as 'the' is a stop word and is previously defined in a dictionary form in a system. Herein, a dictionary means a list including a set of words. That is, the semantic parsing unit 120 carries out a process for generating the natural language token and then removing the stop word that is a portion unnecessary for parsing, in which the stop word filtering is operated to prevent too many tokens from being input during the parsing process when the mathematical problem is long (for example, a descriptive problem, and the like) and improve a processing speed of a system. Further, describing the redundancy removal filtering, for example, when there is a mathematical problem "one solution in the Equation is 3; however, obtain another solution of the Equation.", if the natural words are tokenized, then the tokens "Equation" and "solution" may be each extracted by two. In this case, the redundancy removal filtering can be carried by removing the token regarding the two redundancy 'Equations" and the token regarding the two "solutions" apiece.

The semantic parsing unit 120 carries out the redundancy removal filtering of selecting the redundancy data from the stop word filtering data and removing the selected redundancy data to remove the redundancy data from the natural language token and match a data corresponding to a predicate within the generated redundancy removal data to the predefined meaningful action information, in which the action means summary information that may be extracted based on the natural language token or the mathematical equation token. For example, the action 'solve' may be extracted based on the natural language token or the mathematical equation token in [Example 1]. Herein, matching and storing the data corresponding to a predicate in the redundancy removal data to the action is used as a useful tool, at the time of acquiring information on the representative operation indicated by the overall sentence during the process for defining the combination data (mathematical problem) as a schema to search the information or parse similarity between problems later.

Further, the semantic parsing unit 120 may convert a mathematical equation into a tree type, perform a traversal process on the mathematical equation converted into the tree type, and perform tokenization on the mathematical equation suffering from the traversal process. The semantic parsing unit 120 may convert a mathematical equation written as a mathematical markup language (Math ML) into an XML tree type and then a document object model (DOM) type. The semantic parsing unit 120 may carry out a traversal by a depth-first search method that transfers the configuration information configuring mathematical equations from a lowermost node to an upper node gradually. Meanwhile, describing in detail the traversal process and the depth-first search, the mathematical equation generally has a Math ML type, which is configured in a tree type. A process for searching the node of the tree in order to extract the information from the tree is called a traversal process and the depth-first search may be used at the time of carrying out the traversal process. Since the process for traversing the depth-first search starts from a root of the tree, progresses to child nodes, and moves to a parent node when the search of all the child nodes ends, the process for traversing the depth-first search transfers all the information included in the child nodes to the parent node and carries out the search corresponding to the number of edges that is a connection line connecting between the nodes in terms of time complexity, and therefore is effective. The depth-first search is illustrated herein, but the present disclosure is not limited thereto.

Further, the semantic parsing unit 120 may convert the mathematical contents into a logical combination of a simple sentence to generate the semantic information.

The semantic parsing unit 120 may represent the mathematical content having a mathematical equation and a natural word mixed therein as a combination of simple sentences and may give a meaning through the semantic parsing of the portion represented by C-MathML.

For example, it is assumed that there is a mathematical sentence of the type 'obtain a root satisfying $x^2>1$ for $x^2+2x-3=0$".

The above equation is as follows when the composite sentences are represented as the simple sentences.

Example 2

"Solve $((x^2+2x-3=0) \cap (x^2>1))$"

Solve (quadratic equation∩square root of x that is larger than 1)"

As in the above Example 2, all the composite sentences may be divided into ones connected by logical connectives ($\cap$ (and), $\cup$ (or), ~ (not), $\Rightarrow$ (if)), and the like of the simple sentences. As in the above example, dividing the composite sentences into the logical connectives of the simple sentences is described by way of example, but the present disclosure is not limited thereto, and therefore the composite sentences may be divided into a plurality of simple sentences by various methods.

For example, in the XML of the composite sentence, <SentenceRel> meaning the relationship between the sentences as an XML tag for describing the logical connection between the simple sentences may be used. As the available method, a method, such as <apply> of MathML, may be used.

Figure 3:
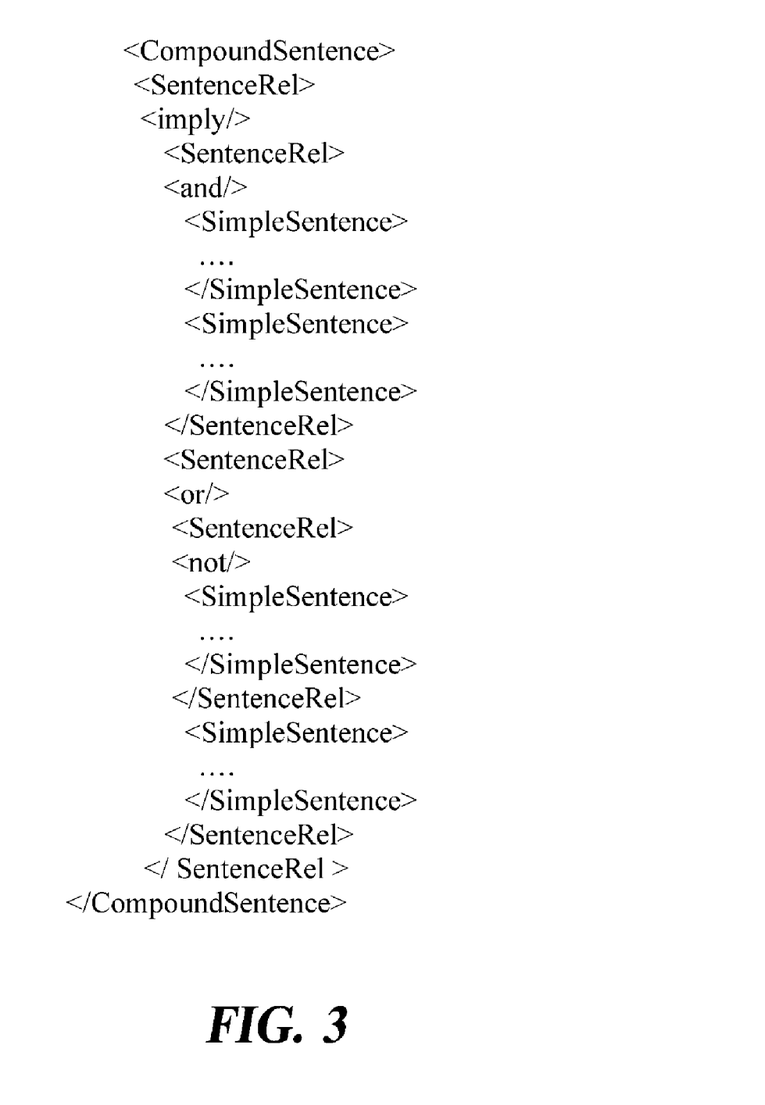
FIG. 3 is a diagram of an XML representation for "$(S_1 \cap S_2) \Rightarrow (\sim S_3 \cup S_4)$"

FIG. 3 is a diagram illustrating an XML representation for "$(S_1 \cap S_2) \Rightarrow (\sim S_3 \cup S_4)$".

Meanwhile, keywords corresponding to the action extracted as the semantic information may be designated. For example, the keywords may have the information on the representative operation indicated by the overall problem during the process for defining the mathematical problem as a schema, by extracting the action called 'solve' from the mathematical contents of Example 1 based on the natural language token and the mathematical equation token. For example, a writer may also use various terms such as Find and Answer as keywords, for example "Find the root of $(x^2+2x-3=0)$ or "Answer $(x^2+2x-3=0)$", and the like, instead of "Solve $(x^2+2x-3=0)$. These keywords are uniquely selected so as to prevent the semantic redundancy meaning. For example, the terms "Find the root of", "Find the solution", "Answer", "Calculate", "What is the value of", and the like unitedly uses the action from the similarity between the following equation as solve. In addition to "solve", there may be several actions such as Evaluate, Integrate, Differentiate, Factorize, and Expand.

Therefore, when various input terms that may be used to extract the keywords corresponding to the action are designated, the action may be extracted according to various inputs representing a single meaning.

Further, the extracted action may include a structural meaning of the natural language token, the directivity of the natural language token, and a point affected by the natural language token. Herein, the directivity may represent whether the action is associated with the above equation for the natural language token, the following equation for the natural language token, or is independent.

Meanwhile, the semantic parsing unit 120 may represent, for example, $(x^2+2x-3=0)$ as "Action (quadratic equation)" or "Action (polynomial (degree=2))", and the like, according to a method for representing the semantic information from a mathematical equation.

Figure 4:
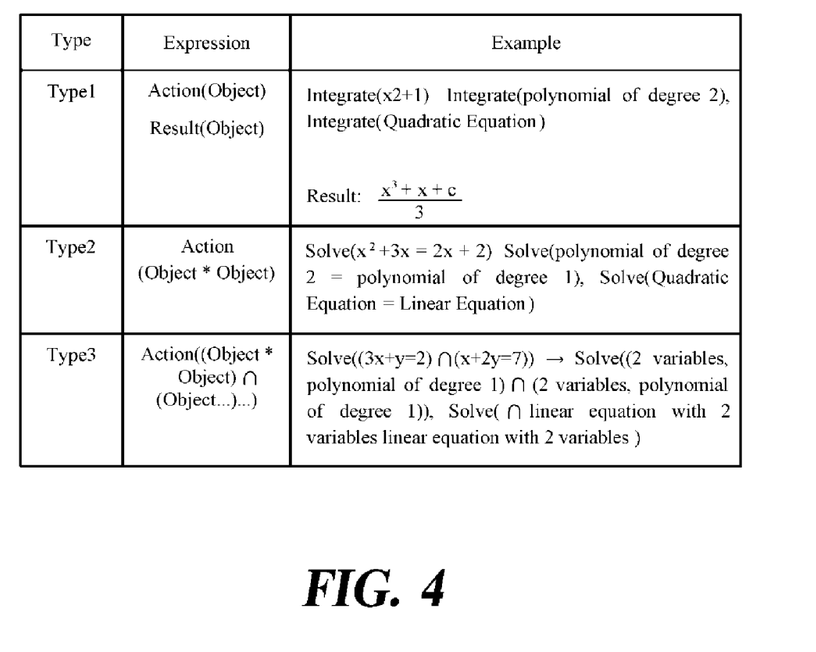
FIG. 4 is a diagram of a primitive type of sentence structure based on a mathematical sentence representation method.

FIG. 4 is a diagram illustrating a primitive type of sentence structure based on a mathematical sentence representation method. The sentence representation type listed in FIG. 4 has representativeness, but more complex type may be added by parsing the mathematical problem.

The semantic information included in the mathematical problem may include the action and a math object.

The action represents an object that is to be basically solved by the mathematical sentence. For example, the action is information extracted from the problem based on the information for an actual solver to take action on whether the corresponding mathematical equation sentence solves a problem, describes a concept, or the like. The information is returned by a defined rule that is pre-processed by the natural language token and the mathematical equation token.

The semantic parsing unit 120 may include a math object generated by matching the mathematical equation that is an object of the natural language token as the semantic information in the mathematical equation token.

In order to extract the actual meaning of mathematical equations composed of the composite sentences including mathematical equations in addition to the natural word and automatically represent the extracted meaning, the semantic parsing unit 120 may carry out the following:

1. Configuring the relationship between the mathematical equation token and the natural language token into a rule.
2. Reading the sentence representing the natural word and the mathematical equation to search the action that the mathematical sentence means.
3. Configuring the math object The math object is used to represent each subdivided entity included in the mathematical problem. That is, the math object may indicate whether any technique or fact is required to solve the mathematical problem, whether any type of function enters in the mathematical problem, and the like. A concept of the object may contribute to scalability for supporting diversity of the mathematical problem. The information obtained from the natural word and the information obtained from mathematical equation may each be a math object type.

As the math object, the information corresponding to knowledge, such as technique, definition, theorem, and the like may be extracted and has scalability and when there is additionally necessary information through the problem parsing, a desired type of category may be made and added.

Based on the mathematical problem semantic information, the available range is very wide. For example, when a certain person wants to practice a problem of solving a quadratic equation, the desired information may be rapidly provided on the basis of the previously extracted information, instead of passing through a process for comparing a natural word, parsing all the XMLs of a MathML type, and confirming whether there is desired information, like a current mathematical problem. Further, the action may also be used even in a process for figuring out ranking between the searched problems and may help a user obtain the optimal searched results.

The action of the acquired mathematical problem and the math object may be stored in various forms according to storage devices, which may be represented in parallel, serial, nested types, and the like.

As components of the simple sentence, semantic description for the math object portion represented by c-MathML may be configured like Table 1, a mathematical object represented by c-MathML is divided into <MathObj> tag, and the relationship with several math objects may be represented by a <MathRel> tag like [Table 1] (Table 1-1 and 1-2).

TABLE 1-1

| Mathematical Object | XML tag | Example |
|---|---|---|
| Set | <Set> | - Set A = {1,2,3}: <Set>FiniteList</Set> |
|  |  | - Set B = {1,2,3,4, ....}: <Set>InfiniteList</Set> |
|  |  | - Set C= {x prime number : x ∈ Natural Number }: <Set>ConditionList</Set> |
| Number System | <NumberSystem> | -Natural Number: <NumberSystem>NaturalNumbers</NumberSystem> |
|  |  | -Integer: <NumberSystem>Integers</NumberSystem> |
|  |  | -Rational Number: <NumberSystem>Rationals</NumberSystem> |
|  |  | -Real Number: <NumberSystem>RealNumbers</NumberSystem> |
|  |  | -Complex Number: <NumberSystem>CompexNumbers</NumberSystem> |
| Arithmetic operation | <MathRel> | +: <MathRel>plus</MathRel> |
|  |  | −: <MathRel>minus</MathRel> |
|  |  | ×: <MathRel>multiple</MathRel> |
|  |  | : <MathRel>divide</MathRel> |
|  |  | %: <MathRel>mod</MathRel> |
| Variable | <var> | Variable x : <var>x</var> |
| Constant | <value> | Constant c: <value>c</value> |
| Function | <Function> type | - Monomial: <Function> Monomial</Function> |
|  |  | - Polynomial: <Function>Polynomial</Function> |
|  |  | - Rational function: <Function> Rational </Function> |
|  |  | - Logarithm: <Function>Log </Function> |
|  |  | - Exponential: <Function>Exp</Function> |
|  |  | -Sine:.<Function> Sin </Function> |
|  |  | - etc ... |
| Mathematical relation | <MathRel> | <eq/> |
|  |  | <noteq/> |
|  |  | <gt/> |
|  |  | <geq/> |
|  |  | <lt/> |
|  |  | <leq/> |

TABLE 1-2

| Quantifier | <Quantifier> | Exist(som, a) ⊃ : <Quantifier>Exist</Quantifier> All ∀: <Quantifier>All</Quantifier> |
|---|---|---|
| Ordering | <OrderRel> | x is bigger than y: <OrderRel>bigger</OrderRel> y is smaller than x: <OrderRel>smaller</OrderRel> y is the smallest in A: <OrderRel>smallest</OrderRel> x is the biggest in A: <OrderRel>biggest</OrderRel> |
| Set Operation | <SetRel> | ⊂ : <SetRel>include</SetRel> |

The index information unit 130 stores information obtained by indexing the semantic information extracted from the semantic parsing unit 120. For example, the index information unit 130 performs the indexing that allocates numbers to the semantic information received through the semantic parsing unit 120 and stores the performed information. The index information unit 130 may generate the semantic index information obtained by indexing the semantic information and generate query index information obtained by matching keyword information to the semantic index information.

The user query input unit 140 receives a query from a user and delivers the input user query to a query parser 150. Herein, the user query is a kind of search query and includes input keywords to be searched by the user.

The user query input unit 140 may perform an operation similar to the information input unit 110 and may receive a combination data (composite sentence) of at least one of a natural word and mathematical equation. The user query input unit 140 may directly receive the combination data of a at least one of natural word and a mathematical equation by user's manipulation or command but the present disclosure is not necessarily limited thereto, and therefore may receive a document data composed of the combination of at least one of a natural word and a mathematical equation from a separate external server.

The query parser 150 extracts the keywords included in the input user query. Herein, the extracted keywords may include the semantic information and the query parser 150 may semantic-parse the input user query to extract the keywords including the semantic information. The operation of the query parser 150 may be similar to an operation of the semantic parsing unit 120. That is, the query parser 150 divides the natural words and the mathematical equation, respectively, in the composite sentence input through the user query input unit 140 and parses each configuration information configuring the divided natural words and mathematical equations to generate the semantic information, thereby generating the keyword generating the natural language token and the mathematical equation token. Herein, the sentence input through the user query input unit 140 may include only the natural word or only the mathematical equation. That is, when only the natural word is included in the input sentence, there may be only the natural token in the generated keyword and when the mathematical equation is included in the input sentence, there may also be only the mathematical equation token in the generated keyword.

The semantic distance extraction unit 160 acquires similarity by extracting the semantic distance indicating similarity between the semantic information included in the keywords extracted from the query parsing unit 150 and the semantic information of the indexed information generated in the semantic parsing unit 120 and stored in the index information unit 140.

It is assumed that there is a general type of mathematical equation like Example 3.

Example 3

"Obtain Two Roots for $x^2+2x-3=0$".

Figure 5:
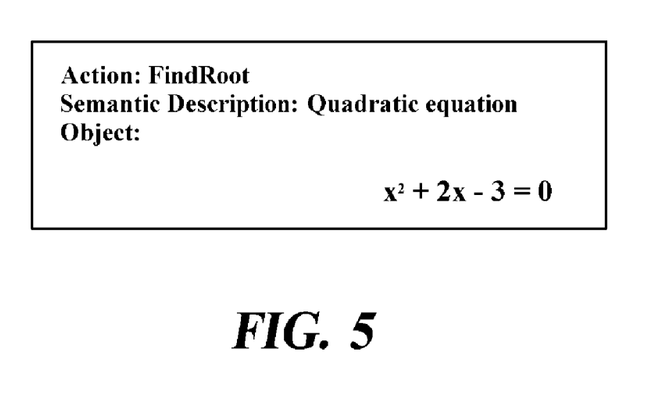
FIG. 5 is a diagram of an example in which mathematical sentences are represented by actions and a semantic description.

The above mathematical sentence represented by the action and the semantic description may be represented like FIG. 5.

In the above Example 3, only the mathematical equation ($x^2+2x-3=0$) of the general sentence may not be a query object and the quadratic equation that is the semantic description information becomes a query object. Therefore, if the set schema is not present, the semantic query cannot be processed, such that the semantic description information may be used as a means for allowing the semantic distance extraction unit 160 to process the semantic query.

Defining the schema based on a combination of the simple semantic description called the quadratic equation like Example 3 and various kinds of semantic descriptions obtained through the problem structuring (subject, problem, solution, and the like), all the problems may be represented as a sentence having more various semantic descriptions.

[Table 2] (Table 2-1, 2-2, 2-3, and 2-4) shows an example of XML description for a single mathematical equation.

TABLE 2-1

Find the all roots of $x^2 - x - 6$ such that $x^2 > 1$.

```
<MathProblemxmlns="http://www.iscilab.com/MathProblem">
    <Description>
        <Subjects>
            <Subject>Polynomials and Polynomial Equations</Subject>
            <Subsubject>Polynomials and Functions</Subsubject>
        </Subjects>
        <Text>Find the positive root of</Text>
        <Mathbody>
            <math display = 'block'>
            <apply>
                <minus/>
                <apply>
                    <minus/>
                    <apply>
                        <power/>
                        <ci>x</ci>
                        <cn>2</cn>
                    </apply>
                    <ci>x</ci>
                </apply>
                <cn>6</cn>
            </apply>
            </math>
```

TABLE 2-2

```
<semantic>
    <polynomial>
        <max_degree>2</max_degree>
        <variable_num>1</variable_num>
    </polynomial>
</semantic>
<CompactForm type="inatheniatica">
    ...
</CompactForm>
</Mathbody>
<Text>such that</Text>
<Mathbody>
    <math display = 'block'>
```

TABLE 2-2-continued

```
      <apply>
      <gt/>
         <apply>
         <power/>
         <ci>x</ci>
         <cn>2</cn>
         </apply>
         <cn>1</cn>
      </apply>
   </math>
            <CompactForm type="mathematica">
            ...
         </CompactForm>
```

TABLE 2-3

```
</Mathbody>
   </Description>
   <Semantic>
      <CompoundSentence>
         <SimpleSentence>
            <Action>Solve</Action>
            <MathObj>
               <Function>
                  <Type>polynomial</Type>
                  <Degree>2</Degree>
                  <CompleteSquare>no</CompleteSquare>
               </Function>
               <Domain>real</Domain>
               <Quantifier>all</Quantifier>
               <Condition>
                  <MathRel>
                     <gt/>
                     <Function>
                     <Type>polynomial</Type>
                     <Degree>2</Degree>
                     </Function>
                     <cn>constant</cn>
                  </MathRel>
               </Condition>
            </MathObj>
```

TABLE 2-4

```
         </SimpleSentence>
         </CompoundSetence>
      </Semantic>
   <Mathematica>...</Mathematica>
   <Solution>
   </Solution>
</MathProblem>
```

According to [Table 2], the mathematical equation content represented by the natural word and the standardized mathematical equation is converted into a type that can be figured out by the device 100 for classifying a mathematical sentence and the semantic information is extracted based on the meaning of the natural word and the mathematical equation and is structured in the XML tree type.

The semantic distance extraction unit 160 acquires the similarity by extracting the semantic distance between the extracted keyword and the semantic information.

Herein, the semantic distance means the distance of the semantic description allocated during the process for converting the composite sentence composed of the mathematical equation and the natural word.

For example, it is assumed that two types of sentences like Examples 4 and 5 are present.

Example 4

"Find Two Roots for $x^2+2x-3=0$".

Example 5

"Find an Integral for Quadratic Equation $x^2+3x+5$."

Representing two mathematical equations by the action and the semantic description, each mathematical equation may be represented by FIGS. 6A and 6B.

Figure 6:
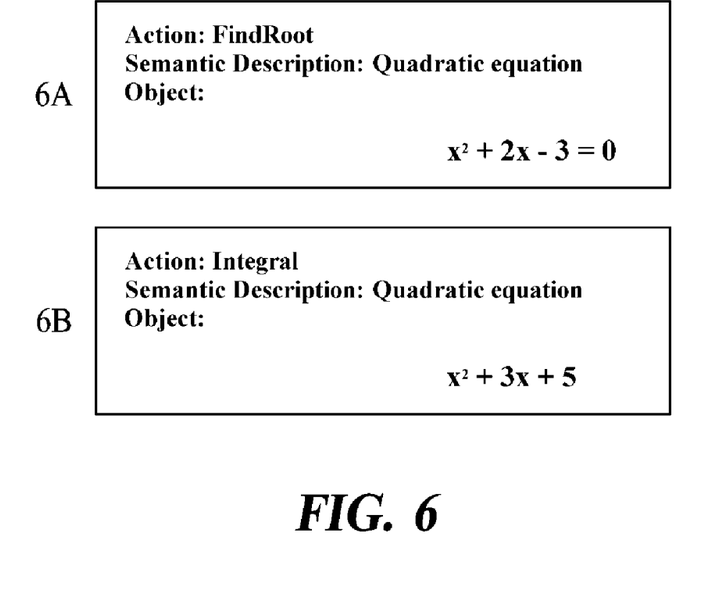
FIG. 6 is a diagram of at least one example in which two mathematical equations are represented by actions and a semantic description.

As illustrated in FIG. 6, only the mathematical equations ($x^2+2x-3=0$) and ($x^2+3x+5$) of a general sentence have a completely different problem in obtaining a root and an indefinite integral of a quadratic equation, but the semantic description is a quadratic equation, and therefore may be determined to be the same. Therefore, defining the semantic distance, the semantic distance between various sentences can be easily measured. For example, the semantic distance of the problem obtaining the root and the indefinite integral of the quadratic equation is defined as 2 and a distance between an indefinite integral and a differential is defined by 1 to measure the semantic distance between the corresponding mathematical sentence and the pre-stored mathematical sentence, thereby acquiring and scoring the similarity.

In order to obtain the semantic distance, the semantic distance extraction unit 160 may determine the semantic distance as a value in response to the number of semantic elements that is common to semantic elements of the extracted keywords and semantic elements of the semantic information indexed and stored in the index information unit 140. Herein, the semantic distance is determines as a value in response to the number of semantic elements, but in the mathematical equation for implementing this, various types of mathematical equations, such as generating the semantic distance as a value in response to a value obtained by multiplying the values of the semantic elements by each other, can be applied in order to obtain the number of common semantic elements.

Further, the semantic distance may be short as the common semantic elements for all the semantic elements of two mathematical problems are increased and the semantic distance may be long as the common semantic elements for all the semantic elements of two mathematical problems are reduced. Further, without considering the total number of semantic elements of two mathematical problems, the semantic distance may be short as the common semantic elements of two mathematical problems are increased and the semantic distance may be long as the common semantic elements are reduced.

The semantic distance extraction unit 160 may use cosine similarity like Equation 1 as an example in which the semantic distance is defined based on the similarity between the semantic information of the keywords input as the user query and the indexed and stored semantic information.

$$\cos(q, p) = \frac{q \cdot p}{|q||p|} = \frac{q}{|q|} \cdot \frac{p}{|p|} = \frac{\sum_{i=1}^{|V|} q_i p_i}{\sqrt{\sum_{i=1}^{|V|} q_i^2} \sqrt{\sum_{i=1}^{|V|} p_i^2}} \quad \text{Equation 1}$$

(p: problem vector, q: query vector, v: the number of elements included in a vector)

Figure 8:
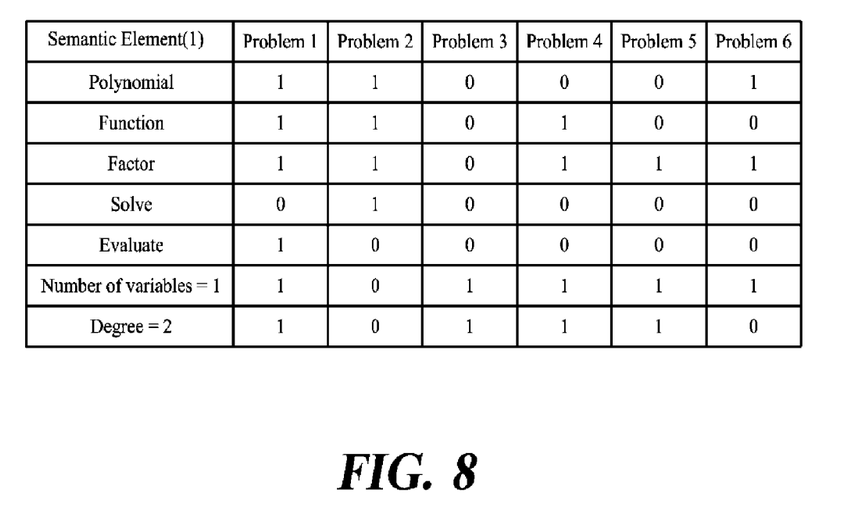
FIG. 8 is a diagram of Boolean values set for each semantic element for indexed mathematical sentences.

Each piece of semantic information included in the first mathematical sentence and the second mathematical sentence for extracting the semantic distance may be represented by a Boolean vector. Therefore, for example, as illustrated in FIG. 8, it may be represented whether semantic i is present in the first mathematical sentence p, with pi being Boolean and it may be represented whether semantic i is present in the second mathematical sentence q, with qi being Boolean. That is, when the Boolean values are set to each semantic element of each mathematical sentence for a polynomial, a function, a factor, a solve solving the problem, an evaluate solving a value, the number of variables, a degree, and the like, in the mathematical sentence, all the mathematical sentences may be represented by the Boolean vector representing the semantic elements as illustrated in FIG. 8

If the indexed and stored semantic information has six sentences as illustrated in FIG. 8, the Boolean vectors of each mathematical problem will be problem 1=(1,1,1,0,1,1,1), problem 2=(1,1,1,1,0,0,0), problem 3=(0,0,0,0,0,1,1), . . . , and the like.

In this case, for example, if the Boolean vector for the semantic element included in the keyword extracted from the user query is (1, 1, 1, 1, 1, 1, 1), the above Equation 1 may be applied to all the stored semantic information as illustrated in FIG. 8 to obtain the semantic distance.

Therefore, when Equation 1 is applied to the Boolean vector of the user query and the Boolean vector of problem, the semantic distance becomes 6/(root(7)*root(6)) and when Equation 1 is applied to the Boolean vector of the user query and the Boolean vector of problem 2, the semantic distance becomes 4/(root(7)*root(4)). Similarly, the above Equation 1 may be applied to all the indexed problems to obtain the semantic distance from the Boolean vector of the user query.

In the above Equation 1, if the cos(q, p) has a value of "0", it means that there is no corresponding semantic information or the semantic distance does not have a relation with the corresponding problem. On the other hand, if the cos(q, p) has a value of "1", it means that there is the semantic information meeting the mathematical problem and the cos(q, p) representing the semantic distance has a value ranging from 0 to 1. In this case, as the value approximates 1, it may be said that the semantic similarity between the two sentences is higher. If the cos(q, p) is 1, it may be considered that the semantic information of the two sentences p, q accurately meets each other and if the cos(q, p) is 0, there is no semantic similarity between the two sentences p and q.

In order to obtain the semantic distance, when the semantic distance extraction unit 160 may generate the semantic distance as a value in response to the number of semantic elements that is common to the semantic elements of the extracted keywords and the semantic elements of the semantic information indexed and stored in the index information unit 140, the semantic extraction unit 160 may set weights to each semantic element.

The semantic distance extraction unit 160 may use weighted cosine similarity like Equation 2 as another example in which the semantic distance is defined based on the association between the semantic information of the keywords input as the user query and the indexed and stored semantic information.

$$\cos_w(q, p) = \frac{\sum_{i=1}^{|V|} w_i q_i p_i}{\sqrt{\sum_{i=1}^{|V|} w_i^2} \sqrt{\sum_{i=1}^{|V|} q_i^2} \sqrt{\sum_{i=1}^{|V|} p_i^2}}$$

Equation 2

(p: problem vector, q: query vector, wi: weight, v: the number of elements included in a vector)

That is, the semantic distance may calculate by allocating a weight wi to each semantic element. In this case, as the semantic elements set to have the higher importance in response to the weight meet each other, the semantic distance between the two mathematical sentences may be calculated as being closer.

In Equation 2 as with Equation 1, if the cos w (q, p) has a value of "0", it means that there is no corresponding semantic information or the semantic distance does not have a relation with the problem present in the column. On the other hand, if the cos w (q, p) has a value of "1", it represents that there is the semantic information meeting the row and if the weight is set to be wi according to the vertical relationship or the importance between the semantic information, a cosine angle between the mathematical sentence vector p and the query vector q may be obtained by using a matrix of the above Equation 1.

In the above Equation 1, since the cos w (q, p) representing the semantic distance has a value ranging from 0 to 1, it may be said that the semantic similarity between the two sentences is higher as the semantic distance approximates 1. If the cos w (q, p) is 1, it may be considered that the semantic information of the two sentences p, q accurately meets each other and if the cos w (q, p) is 0, there is no semantic similarity between the two sentences p and q.

Meanwhile, the semantic distance between the two mathematical equations is in inverse proportion to the weighted sum of weights of the same semantic elements between the two mathematical equations and is in proportion to the weighted sum of weights of all the semantic elements included in the two mathematical equations.

For example, it is assumed that a union of the semantic elements of Equation A and the semantic elements of Equation B is $S=\{s_1, s_2, \ldots, S_n\}$ and a set of the weights corresponding to each of N elements of the union is $W=\{w_1, w_2, \ldots, W_n\}$.

In this case, the sum E of weights of the same semantic elements is calculated by summing the weights of the corresponding semantic elements sm that are equally present in Equations A and B for each element sm (m=1, . . . , N) of S.

Therefore, the semantic distance D of the Equation A and Equation B may be calculated by the following Equation (D=(Sum $(w_m)$/E).

$$\frac{\sum_{m=1}^{N} w_m}{E}$$

Equation 3

Therefore, as shown in Equation 3, it can be appreciated that the semantic distance between the two mathematical equations is in inverse proportion to the sum E of weights of the same semantic elements between the two mathematical equations and is in proportion to the sum (sum($w_m$)) of the weights of all the semantic elements included in the two mathematical equations.

In this case, for each semantic element, the weight ($w_m$) may be equal (for example, 1) and for each semantic element, the weight ($w_m$) may be different according to the importance between the semantic elements.

For example, it is assumed that there are the following three problems A, B, and C.
1. Problem A: solve Equation $x^2+2x+1=0$
2. Problem B: solve Equation $x^2-4=0$
3. Problem C: solve Equation $x3-1=0$ (however, x>0)

Further, when the semantic information extracted from each of the above problems is as follows:

Semantic element operation (solve) of Problem A, degree (quadratic equation), the number of terms (three terms)

Semantic element operation (solve) of Problem B, degree (quadratic equation), the number of terms (two terms)

Semantic element operation (solve) of Problem C, degree (quadratic equation), the number of terms (two terms), conditional inequality.

If it is assumed that the weight of all the semantic elements is 1, since the sum (Sum $(w_m)$) of all the semantic elements is 3 and the sum E of weights of the same semantic element is 2 when the same semantic element between the problem A and the same problem B includes the operation ('solve') and the degree (quadratic equation), the semantic distance D between the problem A and the problem B becomes (D=3/2=1.5) by the calculation of the above Equation 3. Further, since the sum (Sum($w_m$)) of weights of all the semantic elements is 4 and the sum E of weights of the same semantic element is 1 when the same semantic element between the problem A and the problem C include only the operation ('solve') the semantic distance between the problem A and the problem C becomes (D=4/1=4). Further, since the sum (Sum($w_m$)) of all the semantic elements is 4 and the sum E of weights of the same semantic element is 2 when the semantic element between the problem A and the problem C includes the operation ('solve') and the number of terms (two terms), the semantic distance between the problem B and the problem C becomes (D=4/2=2).

If the weight of the degree is 2 and the remaining information is 1 by considering the equation degree information most importantly, since the sum (Sum $(w_m)$) of all the semantic elements is 4 and the sum E of weights of the same semantic element is 3 when the same semantic element between the problem A and the problem B includes the operation ('solve') and the degree (quadratic equation), the semantic distance between the problem A and the problem B becomes (D=4/3=1.33). Further, since the sum (Sum($w_m$)) of weights of all the semantic elements is 5 and the sum E of weights of the same semantic element between the problem A and the problem C is 1, the semantic distance between the problem A and the problem C becomes (D=5/1=5). Further, since the sum (Sum($w_m$)) of weights of all the semantic elements is 5 and the sum E of weights of the same semantic element between the problem A and the problem C is 2, the semantic distance between the problem B and the problem C becomes (D=5/2=2.5).

As described above, when the value of the semantic distance between the mathematical problems is small, it is determined that the similarity between the two mathematical problems is high and when the value of the semantic distance is large, it is determined that the similarity between the two mathematical problems is low, such that the information may be used.

The outcome providing unit 170 may provide a ranking result page of the query index information scored by the similarity calculated by the measurement of the semantic distance. Herein, the ranking result page may be provided to a server or a terminal requesting the ranking result page, but the present disclosure is not necessarily limited thereto and when the device 100 for classifying a mathematical sentence is implemented by a stand alone device, the corresponding ranking result page may be displayed through a display unit.

That is, the user query input through the user query input unit 140 is parsed by the query parser 150 and is transferred to the semantic distance extraction unit 160 and the outcome providing unit 170 compares and scores the similarities between the semantic distance based on the index for the pre-stored mathematical content and the index of the user query and outputs the ranking to the user result page.

Figure 7:
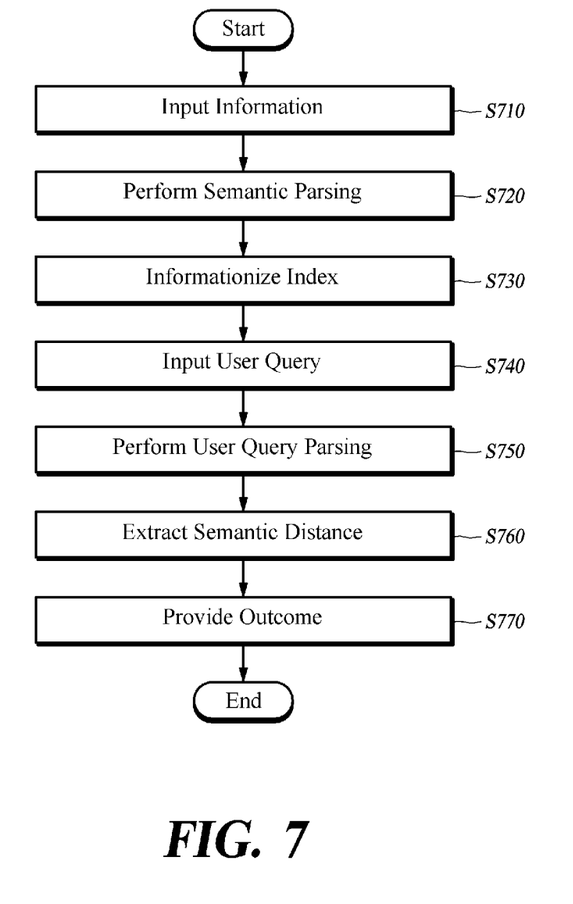
FIG. 7 is a flow chart for of a method for classifying mathematical sentences sensor according to at least one embodiment of the present disclosure.

FIG. 7 is a flow chart for describing a method for classifying mathematical sentences sensor according to at least one further embodiment of the present disclosure.

A method for classifying a mathematical sentence according to at least one further embodiment of the present disclosure includes an information input process for receiving a composite sentence including at least one of a natural word and a mathematical equation (S710), a semantic parsing process for configuring the natural word and the mathematical equation, respectively, from a composite sentence and parsing each configuration information configuring the divided natural words and mathematical equations to generate the semantic information and generate the natural language token and the mathematical equation token (S720), an index information process for storing the information indexing the extracted semantic information (S730), a user query input process for receiving the query from the user (S740), a query parsing process for extracting the keywords included in the input user query (S750), a semantic distance extracting process for acquiring the similarity by extracting the semantic distance between the extracted keywords and the semantic information (S760), and an outcome providing process for providing the ranking result page of the query index information scored by the similarity calculated by the measurement of the semantic distance (S770).

Herein, the information inputting process (S710) corresponds to the operation of the information input unit 110, the semantic parsing process (S720) corresponds to the operation of the semantic parsing unit 120, the index information process (S730) corresponds to the operation of the index information unit 130, the user query inputting process (S740) corresponds to the operation of the user query input unit 140, the query parsing process (S750) corresponds to the operation of the query parsing unit 150, the semantic distance extraction process (S760) corresponds to the operation of the semantic distance extraction unit 160, and the outcome providing process (S770) corresponds to the operation of the outcome providing unit 170, respectively, and the detailed description thereof will be omitted.

According to the present disclosure as described above, the similarity can be acquired between the stored mathematical contents at the time of searching the input mathematical sentences, by extracting the semantic distance contained in the mathematical sentences (single or composite sentence) composed of at least one of the natural word and the standardized mathematical equation.

Further, the semantic information can be efficiently extracted by converting the input composite sentences into the logical combination of a single sentence and generating the semantic information. Further, operation information or the action of the mathematical sentences can be extracted by matching the representative keywords when the action representations of various sentences are input by defining the representative keywords represented by the mathematical sentences and describing the action.

Additionally provided is the search environment of mathematical contents which cannot be searched by the search method according to the related art, based on the searched results provided by figuring out the similarity between the queries for searching mathematical sentences and the stored mathematical sentences, by recognizing the mathematical equation which is not recognized by the natural language processing method.

The above methods are performed by one or more processors of one or more computer systems as described herein, e.g., by the information input unit 110, the semantic parsing unit 120, the index information unit 130, the user query input unit 140, the query parsing unit 150, the semantic distance extraction unit 160, and the outcome providing unit 170. The one or more processors are hardwired and/or programmed to perform the described example operations. Further, the described example operations are not necessarily required to be performed in the order shown and/or described. Operations may be added, replaced, changed order, and/or eliminated as appropriate, in accordance with the spirit and scope of embodiments of the disclosure. Embodiments that combine different features and/or different embodiments are within the scope of the disclosure and will be apparent to those of ordinary skill in the art after reviewing this disclosure.

As described above, the method for classifying a mathematical sentence according to at least one further embodiment of the present disclosure illustrated in FIG. 7 is implemented by programs and may be recorded in a non-transitory computer readable recording medium. The computer readable recording medium recorded with programs for implementing the method for classifying a mathematical sentence according to at least one embodiment of the present disclosure includes all types of recording devices in which data readable by a computer system are stored. An example of the computer readable recording medium may include a ROM, a RAM, a CD-ROM, a magnetic tape, a floppy disk, an optical data storage device, and the like. Further, the non-transitory computer readable recording medium is distributed into a computer system connected with a network and may be also stored with the computer readable code by a distribution type and executed. Further, functional programs, codes, and code segments for implementing at least one embodiment of the present disclosure may be easily inferred by programmers of a skilled in the art to which the embodiment of the present disclosure pertains.

In the description above, although all of the components of various embodiments of the present disclosure may have been explained as assembled or operatively connected as a unit, one of ordinary skill would understand the present disclosure is not limited to such embodiments. Rather, within some embodiments of the present disclosure, the respective components are selectively and operatively combined in any number of ways. Although exemplary embodiments of the present disclosure have been described for illustrative purposes, those skilled in the art will appreciate that various modifications, additions and substitutions are possible, without departing from the essential characteristics of the disclosure. Therefore, exemplary embodiments of the present disclosure have been described for the sake of brevity and clarity. Accordingly, one of ordinary skill would understand the scope of the disclosure is not limited by the explicitly described above embodiments.

Some embodiments as described above can extract the semantic distance contained in the mathematic sentences composed of the natural word and the standardized mathematical equation in preparation for searching the input mathematical sentence to give the similarity between the stored mathematical contents, thereby providing a user search environment with a great industrial applicability.

The invention claimed is:

1. An apparatus for extracting a semantic distance, the apparatus comprising:
   a user query input unit configured to receive a user query;
   a query parsing unit configured to extract at least one keyword included in the received user query;
   an index information unit configured to index one or more of natural language tokens and mathematical equation tokens, wherein the natural language tokens and the mathematical equation tokens each include semantic information;
   a semantic distance extraction unit configured to
      extract a semantic distance, between the at least one extracted keyword and the one or more indexed semantic information, and
      acquire a similarity of the received user query and the semantic information based on the extracted semantic distance; and
   a semantic parsing unit (120) individually divide the natural word and the mathematical equation from the composite sentence, by perform a process of tokenizing the natural language tokens to generate the natural word and classify the composite sentence, wherein the process of tokenizing includes (i) a process of filtering a stop word based on the natural language token to generate a stop word filtering data, (ii) a process of redundancy removal filtering on the stop word filtering data to generate a redundancy removal filtering data, and (iii) a process of matching a predefined meaningful action to the redundancy removal filtering data.

2. The apparatus of claim 1, further comprising:
   an information input unit configured to receive a composite sentence including at least one of a natural word and a mathematical equation; and
   the semantic parsing unit configured to
      parse each piece of configuration information constituting the divided natural word and mathematical equation,
      generate the semantic information corresponding to each of the divided natural word and mathematical equation based on said each piece of the configuration information, and
      generate the natural language tokens and the mathematical equation tokens based on the generate semantic information.

3. The apparatus of claim 2, wherein the semantic parsing unit is further configured to convert the composite sentence into a logical combination of a simple sentence to generate the semantic information.

4. The apparatus of claim 2, wherein the semantic parsing unit is further configured to
   generate a natural language token by tokenizing the natural word,
   generate stop word-filtered data by filtering a stop word based on the natural language token,
   generate a redundancy-filtered data by performing a redundancy removal filtering on the stop word-filtered data, and
   make a match of the redundancy-filtered data with operational information having an acquired predefined meaning.

5. The apparatus of claim 2, wherein the semantic parsing unit is further configured to
   convert the mathematical equation into a tree form,
   perform a traversal process on the tree form of the mathematical equation, and perform a tokenization on the transversal-processed mathematical equation into a mathematical equation token.

6. The apparatus of claim 2, wherein
the semantic information includes operational information of the composite sentence,
the semantic parsing unit is configured to extract the operational information by referring to a rule with a combination of at least one of a natural word and a mathematical equation combined with corresponding operational information to the combination, and comparing the natural language tokens and the mathematical equation tokens with the rule.

7. The apparatus of claim 6, wherein the operational information includes structural meanings of the natural language tokens, directivities of the natural language tokens and points affected by the natural language tokens.

8. The apparatus of claim 7, wherein the directivities represent whether
the operational information is associated with one or more preceding mathematical equations of the natural language tokens or one or more following mathematical equations of the natural language tokens, or
the operational information is independent from the one or more preceding or following mathematical equations.

9. The apparatus of claim 1, wherein the semantic information includes one or more math objects, wherein the math objects are entities generated based on the natural language tokens and the mathematical equation tokens.

10. The apparatus of claim 1, wherein the query parsing unit is further configured to
individually divide natural words and mathematical equations from the user query, and
parse each piece of the configuration information constituting the divided natural words and mathematical equations to generate the semantic information and extract the keyword including the natural language tokens and the mathematical equation tokens.

11. The apparatus of claim 1, wherein the semantic distance extraction unit is configured to extract the semantic distance as a value in proportion to the number of common semantic elements of the extracted keyword and the indexed semantic information.

12. The apparatus of claim 11, wherein each of the semantic elements has a corresponding weight.

13. The apparatus of claim 12, wherein the semantic distance is in inverse proportion to a weighted sum of the common semantic elements, and is in proportion to a weighted sum of the semantic elements included in the extracted keyword and the indexed semantic information.

14. The apparatus of claim 11, wherein
the semantic distance has a shorter value as the common semantic elements get greater than the semantic elements of the extracted keyword summed with the semantic elements of the indexed semantic information, and the semantic distance has a longer value as the common semantic elements get lesser than the summed semantic elements.

* * * * *